United States Patent
Crouse et al.

[11] Patent Number: 5,925,990
[45] Date of Patent: Jul. 20, 1999

[54] MICROPROCESSOR CONTROLLED ELECTRONIC BALLAST

[75] Inventors: Kent E. Crouse; Ronald J. Bezdon, both of Schaumburg; Michael W. Bandel, Elk Grove Village; Patrick J. Keegan; Boyko Boykov, both of Schaumburg; Peter W. Shackle, Arlington Heights; William L. Keith, Algonquin, all of Ill.

[73] Assignee: Energy Savings, Inc., Schaumburg, Ill.

[21] Appl. No.: 08/995,278

[22] Filed: Dec. 19, 1997

Related U.S. Application Data

[51] Int. Cl.$^6$ ..................................... G05F 1/00
[52] U.S. Cl. ................. 315/307; 315/308; 315/291; 315/127; 315/224; 315/DIG. 7
[58] Field of Search ................... 315/307, 308, 315/291, 224, 209 R, 244, 241 R, 91, 106, 107, DIG. 5, DIG. 7

[56] References Cited

U.S. PATENT DOCUMENTS

| | | | |
|---|---|---|---|
| 4,396,872 | 8/1983 | Nutter | 315/308 |
| 4,952,849 | 8/1990 | Fellows et al. | 315/307 |
| 5,177,409 | 1/1993 | Nilssen | 315/293 |
| 5,373,218 | 12/1994 | Konopka et al. | 315/291 |
| 5,493,180 | 2/1996 | Bezdon et al. | 315/91 |
| 5,493,181 | 2/1996 | Shackle et al. | 315/241 R |
| 5,680,015 | 10/1997 | Bernitz et al. | 315/291 |
| 5,691,605 | 11/1997 | Xia et al. | 315/307 |
| 5,808,422 | 9/1998 | Venkitasubrahmanian et al. | 315/225 |

OTHER PUBLICATIONS

Data Sheet for L6560; SGS–Thomson Microelectronics; Mar. 1995.
Data Sheet for ST62T52B; SGS–Thomson Microelectronics; Aug. 1997.
Data Sheet for IR2104; International Rectifier; 1996.

*Primary Examiner*—Haissa Philogene
*Attorney, Agent, or Firm*—Paul F. Wille

[57] ABSTRACT

An electronic ballast includes an AC to DC converter for power factor correction, a bulk capacitor for storing energy from the converter, and a microprocessor controlled, half-bridge inverter including a series resonant, direct coupled output. Input ports of the microprocessor are coupled to several locations within the ballast to monitor the operation of the ballast or the operation of a gas discharge lamp coupled to the ballast. An analog voltage limiter overrides the microprocessor to limit output voltage under fault conditions. A storage capacitor, connected in series with the bulk capacitor, stores energy at low voltage for powering the microprocessor. The microprocessor is programmed to provide lamp protection features, lumen maintenance, and a warm-up period for a lamp. The microprocessor is also programmed to meet the operating requirements of world markets and of different lamp types.

32 Claims, 5 Drawing Sheets

MICROPROCESSOR CONTROLLED ELECTRONIC BALLAST

BACKGROUND OF THE INVENTION

This invention relates to electronic ballasts for gas discharge lamps and, in particular, to an electronic ballast that is controlled by a microprocessor.

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. A "magnetic" ballast is an inductor in series with the lamp and is more efficient than a resistor but is physically large and heavy. A large inductor is required because impedance is a function of frequency and power lines operate at low frequency (50–60 hz.)

An electronic ballast typically includes a rectifier for changing the alternating current (AC) from a power line to direct current (DC) and an inverter for changing the direct current to alternating current at high frequency, typically 25–60 khz. Because the frequency of the inverter is much higher than 50–60 hz., the inductors for an electronic ballast are much smaller than the inductor in a magnetic ballast.

Some ballasts include a boost circuit between the rectifier and the inverter. As used herein, a "boost" circuit is a circuit that increases the DC voltage, e.g. from approximately 180 volts (assuming a 120 volt input) to 300 volts or more, for operating a lamp and for providing power factor correction. "Power factor" is a figure of merit indicating whether or not a load in an AC circuit is equivalent to a pure resistance, i.e. indicating whether or not the voltage and current are in phase. It is preferred that the load be the equivalent of a pure resistance (a power factor equal to one). The boost circuit, the inverter, or both, can be self-oscillating, triggered, or driven.

There are many additional circuits described in the prior art for automatically shutting off a ballast in the event of a fault. A fault may be a problem with the ballast itself, e.g. high temperature, or with the lamp, e.g. a broken filament. These faults are addressed in a number of ways, all of which increase the complexity and cost of an electronic ballast. One cannot add circuits ad infinitum to accommodate every conceivable fault because the circuitry becomes too complex, the fault detectors interact unfavorably, and the ballast simply becomes too expensive to be commercially viable. U.S. Pat. No. 5,493,181 (Shackle et al.) discloses a ballast that accommodates several faults while efficiently providing power for a gas discharge lamp.

As known in the art, the number and type of gas discharge lamps continues to increase, creating the need for a like number of ballasts to meet the requirements of each lamp type and to meet the inconsistent safety regulations among the several markets for gas discharge lamps. This proliferation of ballast types is compounded by the various power line voltages around the world, e.g. 120V, 127V, 220V, 230V, or 277V. There remains a need for an electronic ballast capable of efficiently supplying the correct voltage and correct current for several lamp types while meeting the various voltage and safety requirements of global markets.

When there is a fault and an electronic ballast shuts down, particularly an electronic ballast that can accommodate several different faults, it is not known what happened. The only clue that something is wrong is that a lamp is off when it should be on. For someone about to remove a lamp or inspect a ballast, it would be desirable to have some idea of what went wrong.

There are several microprocessors on the market that include memory, input/output (I/O) ports, timing, and analog to digital conversion capability. These microprocessors, also known as microcontrollers, are used in a wide variety of applications, including the control of an electronic ballast. U.S. Pat. No. 5,680,015 (Bernitz et al.) discloses a ballast for a high intensity discharge lamp wherein a microprocessor controls a driven half-bridge inverter having a series resonant, direct coupled output. The Bernitz et al. ballast is described in more detail in the Detailed Description section.

In view of the foregoing, it is therefore an object of the invention to provide an electronic ballast that is adaptable to many types of gas discharge lamps with minimal changes in hardware.

A further object of the invention is to provide an electronic ballast that is adaptable to differing safety requirements of world markets with minimal changes in hardware.

Another object of the invention is to provide an electronic ballast that can accommodate a wide range of faults without damage to the ballast and, if a lamp should fail, without further damage to a lamp coupled to the ballast.

A further object of the invention is to provide an electronic ballast that can communicate the nature of a fault in response to an inquiry.

Another object of the invention is to provide an electronic ballast that can operate on any common power line voltage around the world.

SUMMARY OF THE INVENTION

The foregoing objects are achieved by a ballast including an AC to DC converter for changing alternating current at low voltage to direct current at high voltage, a bulk capacitor for storing energy from the converter, a half-bridge output circuit coupled to the converter, a drive circuit for controlling the half-bridge output circuit, and a microprocessor coupled to the drive circuit for providing high frequency pulses to the drive circuit. The microprocessor includes input and output ports. The input ports are coupled to several locations within the ballast to monitor the operation of the ballast or the operation of a gas discharge lamp coupled to the ballast. In accordance with one aspect of the invention, an analog fault detector is coupled to the microprocessor for overriding the microprocessor in the event of a fault. Specifically, the analog fault detector interrupts each of the high frequency pulses to reduce the duty cycles of the high frequency pulses, thereby providing cycle by cycle regulation of the output voltage of the ballast. In accordance with another aspect of the invention, a storage capacitor stores energy at low voltage for powering the microprocessor. The storage capacitor and the bulk capacitor are connected in series, thereby enabling the ballast to turn on rapidly. The microprocessor is programmed to provide lamp protection functions, an indication of the condition of the ballast or a lamp coupled to the ballast, lumen maintenance, and a warm-up period for a lamp coupled to the ballast. The microprocessor is also programmed to meet the operating requirements of world markets and of different lamp types, thereby obviating the need for significant hardware changes to adapt a ballast to a particular market.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
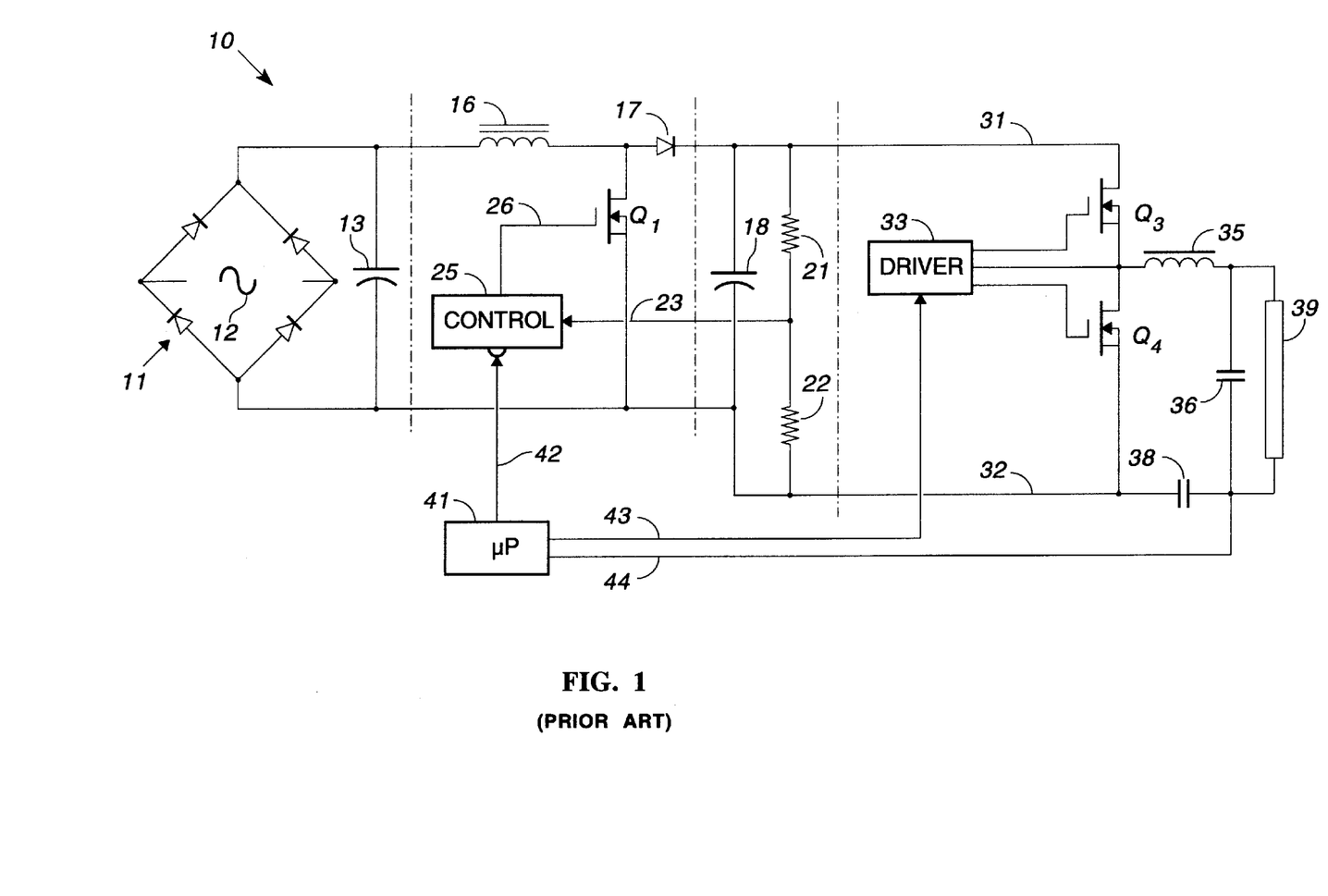
FIG. 1 is a schematic of an electronic ballast of the prior art.

FIG. 1 is a schematic representing the ballast described in the above-identified patent to Bernitz et al. Ballast 10 includes bridge rectifier 11 coupled to an AC power line, represented by waveform 12. The output from bridge rectifier 11 is coupled to storage capacitor 13. Current from capacitor 13 passes through inductor 16 and diode 17 to charge storage capacitor 18. Resistors 21 and 22 are connected in series across capacitor 18 and the junction thereof is connected by line 23 to boost control circuit 25. Control circuit 25 is coupled to the gate of transistor $Q_1$ by line 26 and causes the transistor to switch on and off at a high frequency, thereby boosting the voltage on capacitor 18. When transistor $Q_1$ is conducting, current flows through inductor 16 and transistor $Q_1$. When transistor $Q_1$ stops conducting, the field in inductor 16 collapses and the inductor produces a high voltage that adds to the voltage from the bridge rectifier 11. Diode 17 prevents current from flowing back to transistor $Q_1$ from capacitor 18.

Transistors $Q_3$ and $Q_4$ are connected in series between rails 31 and 32, which are connected to capacitor 18. Transistors $Q_3$ and $Q_4$ are alternately rendered conductive under the control of driver 33. Inductor 35 and capacitor 36 are connected in the series between the junction of transistors $Q_3$ and $Q_4$ and common rail 32. Inductor 35 and capacitor 36 form a series resonant output circuit to the converter. Lamp 39 is connected in parallel with capacitor 36, making what is known as a direct coupled output. Capacitor 38 is known as the half bridge capacitor and is connected in series with lamp 39, between lamp 39 and common.

During operation, transistors $Q_3$ and $Q_4$ conduct alternately, thereby connecting inductor 35 to high voltage rail 31 and then to common rail 32. The signal into inductor 35 is a square wave signal that is converted into a sinusoidal waveform by the series resonant circuit.

Boost control 25 and driver 33 are controlled by microprocessor 41. Specifically, microprocessor 41 is connected to an inhibit input of control 25. Microprocessor 41 also provides a high frequency signal on line 43 to driver 33. Line 44 provides feedback from half bridge capacitor 38 to microprocessor 41 for sensing the operation of the ballast. The Bernitz et al. patent discloses that the input from half bridge capacitor 38 provides information on lamp flicker and on lamp extinction.

Figure 2:
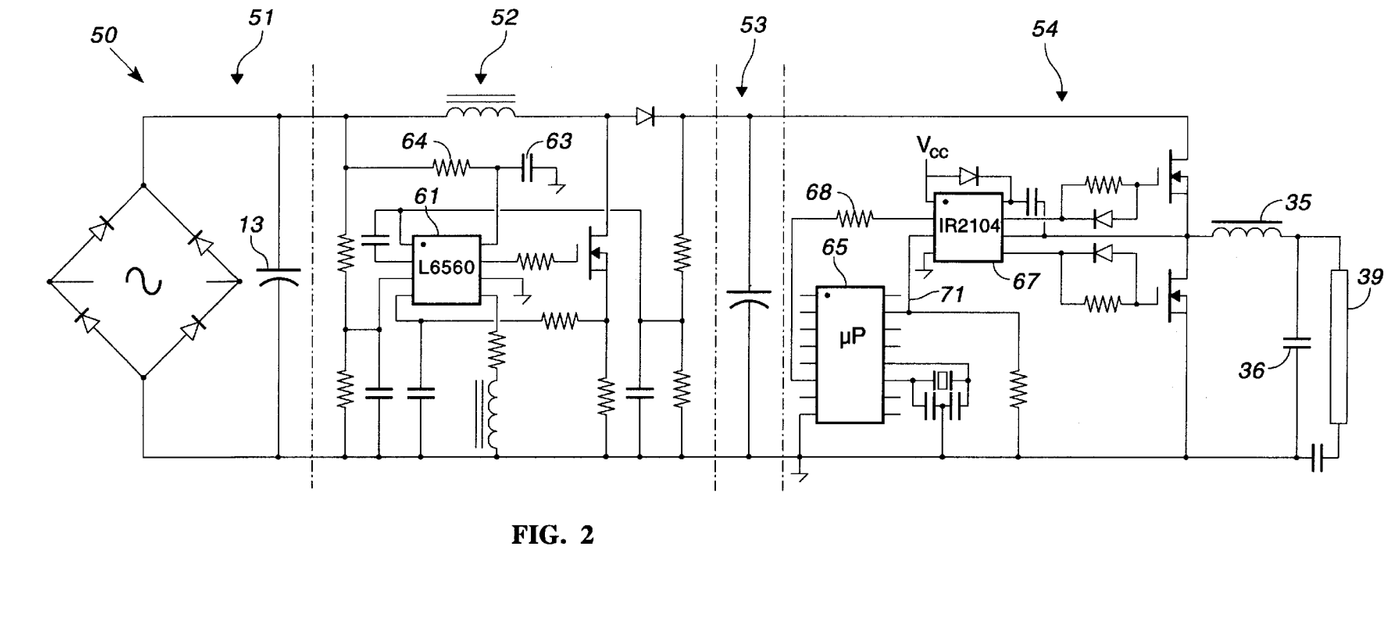
FIG. 2 is a schematic of a ballast constructed in accordance with a preferred embodiment of the invention.

FIG. 2 illustrates a ballast constructed in accordance with the invention. In FIG. 2, pin 1 of the integrated circuits is indicated by a small dot and the pins are numbered consecutively counterclockwise. Ballast 50 includes converter section 51 for producing DC from line voltage, boost section 52 for increasing the DC voltage, storage section 53 for storing energy to drive a lamp, and inverter section 54 for driving a lamp.

Figures 3, 4, 5:
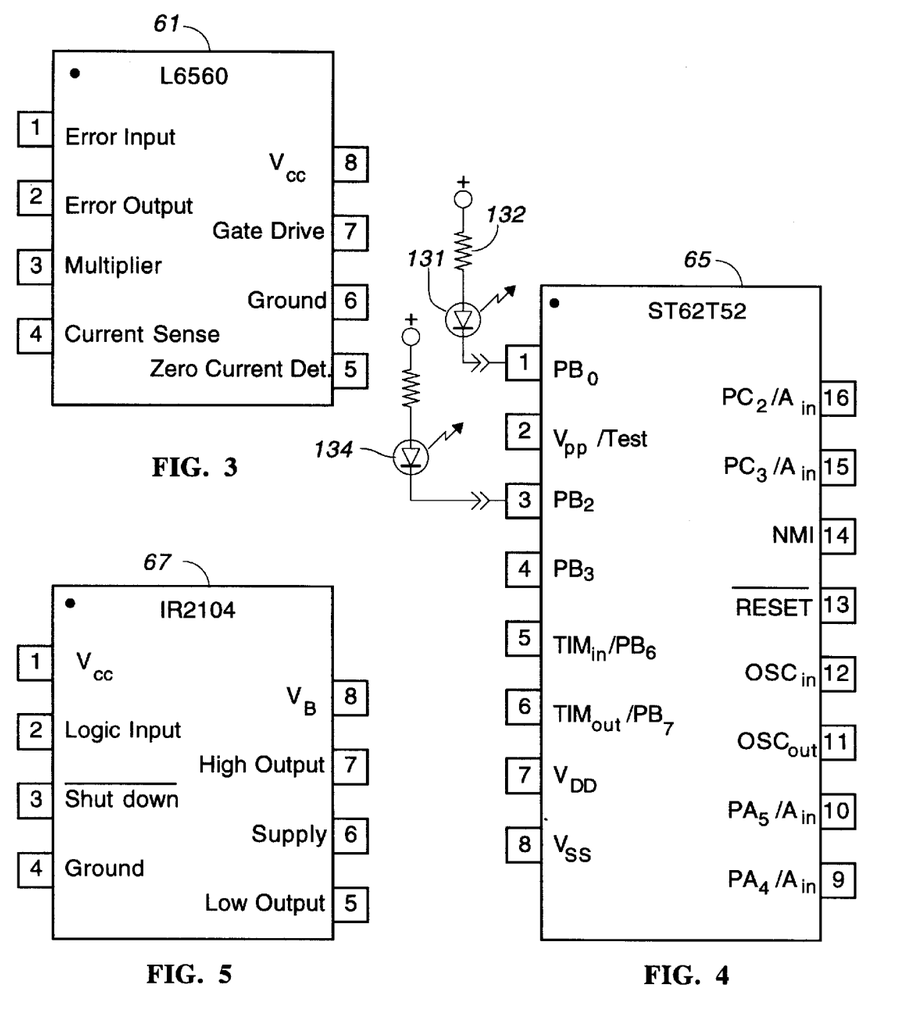
FIG. 3 is a diagram showing the pin-outs of an integrated circuit used for controlling the boost portion of a ballast constructed in accordance with one embodiment of the invention.
FIG. 4 is a diagram showing the pin-outs of a microprocessor used for controlling a ballast constructed in accordance with one embodiment of the invention.
FIG. 5 is a diagram showing the pin-outs of a driver circuit used for controlling the inverter portion of a ballast constructed in accordance with one embodiment of the invention.

In one embodiment of the invention, boost section 52 includes boost controller 61 implemented as an L6560 power factor correction circuit as sold by SGS-Thomson Microelectronics. Boost section 52 is essentially the same as the circuit recommended in the data sheets accompanying the L6560 integrated circuit. FIG. 3 is a diagram of the pin designations for this particular integrated circuit. As illustrated in FIG. 2, boost section 52 operates independently of microprocessor 65.

Microprocessor 65 is coupled to two inputs of driver circuit 67. Specifically, high frequency pulses are coupled through resistor 68 to pin 2 of driver 67. Pin 3 of driver 67 is a disable input and is coupled to another output of microprocessor 65. In the event of a fault, disable line 71 is brought low, thereby shutting off the inverter. Inverter 54 operates substantially in the same way as the inverter illustrated in FIG. 1 and includes a half bridge, series resonant, direct coupled output.

FIG. 4 is a diagram indicating the pin designations for a particular microprocessor, namely the 62T52 microprocessor as sold by SGS-Thomson Microelectronics. Pins 1, 3 and 4 are part of an I/O port that can sink up to twenty milliamperes of current for driving an LED attached to each pin. The ports are programmable under software control. FIG. 5 illustrates the pin designations for driver circuit 67, implemented as an IR2104 driver circuit as sold by International Rectifier Corporation.

Figure 6:
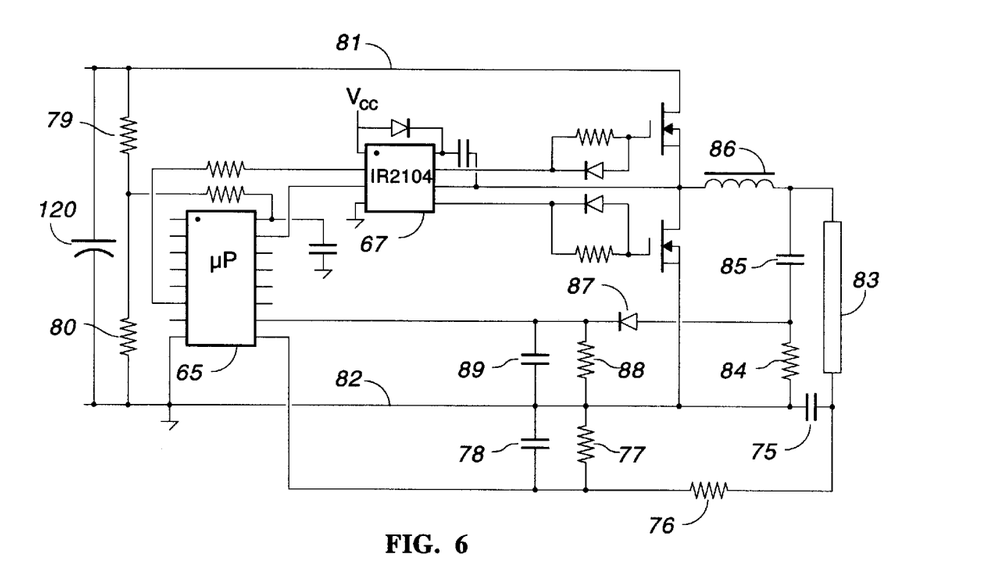
FIG. 6 illustrates fault detection in accordance with one aspect of the invention.
Figure 7:
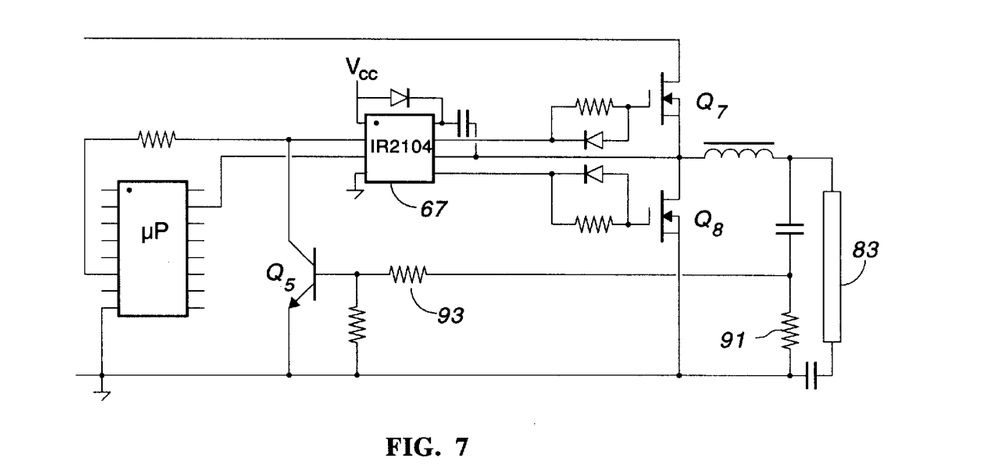
FIG. 7 illustrates overvoltage detection in accordance with another aspect of the invention.
Figure 8:
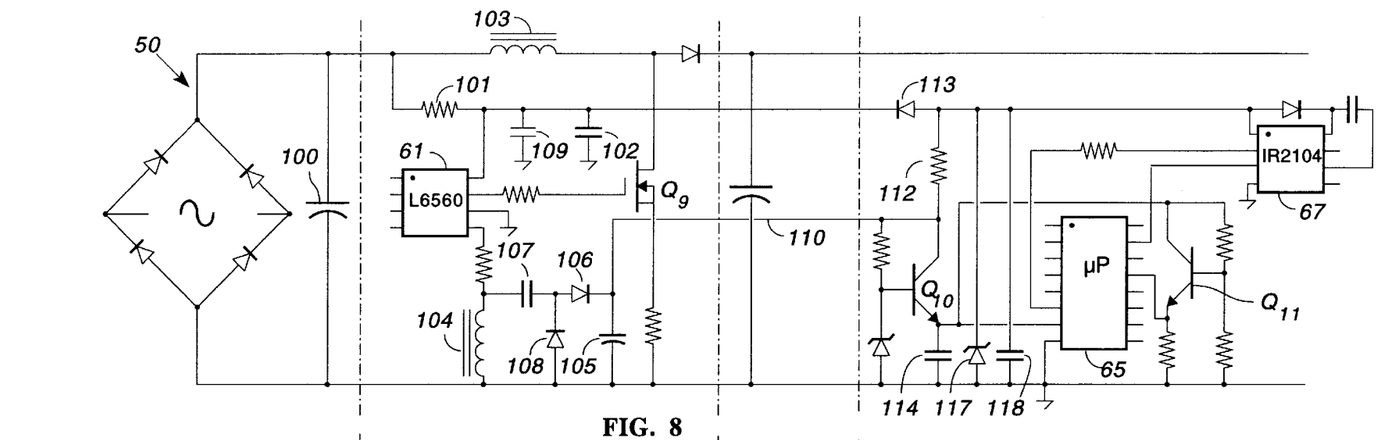
FIG. 8 illustrates powering the integrated circuits of a ballast in accordance with one aspect of the invention.
Figure 9:
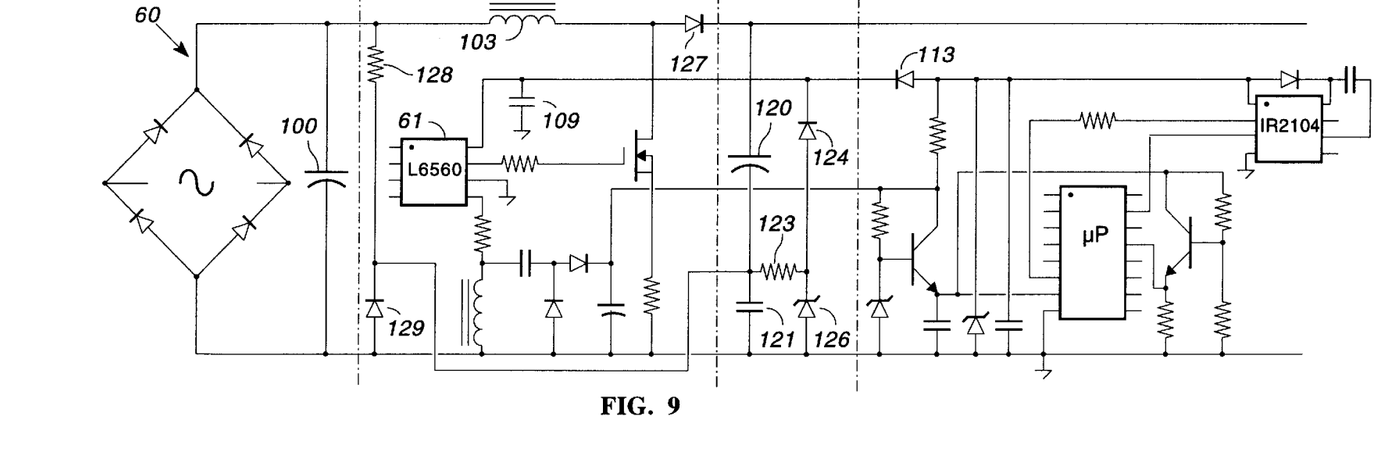
FIG. 9 illustrates powering the integrated circuits of a ballast in accordance with another aspect of the invention.

In FIG. 2, several of the pins of microprocessor 65 are not connected to other parts of the circuit. FIGS. 6 and 7 illustrate connections for sensing various conditions within the ballast or in a lamp coupled to the ballast. FIGS. 8 and 9 illustrate different mechanisms for providing power to the integrated circuits in accordance with another aspect of the invention. In FIG. 2, boost controller 61 is powered by the voltage at the junction of capacitor 63 and resistor 64. This configuration is expanded upon in FIGS. 8 and 9.

In FIG. 6, pin 9 of microprocessor 65 monitors the DC voltage across half-bridge capacitor 75 and pin 10 monitors the AC voltage across lamp 83. Pins 9 and 10 are programmed as input ports and have analog to digital conversion capability. The signal on capacitor 75 is filtered by a low pass filter including resistor 77 and capacitor 78. The voltage drop across capacitor 75 is approximately one-half the voltage between high voltage rail 81 and common rail 82 when lamp 83 is connected to the ballast and is operating normally. In the absence of a lamp, or if a lamp is defective, e.g. begins rectifying, then the voltage across capacitor 75 is greater than or less than one half the rail voltage. The abnormal voltage is sensed by microprocessor 65 and the inverter is shut off, i.e. high frequency pulses are no longer applied to pin 2 of driver 67 or shut down pin 3 of driver 67 is brought low.

If lamp 83 were a rapid start lamp, a high value resistor (not shown) in parallel with the lamp provides a resistive path through each filament from inductor 86 to capacitor 75 and enables one to sense filament continuity. During starting, the absence of a DC voltage on half-bridge capacitor 75, indicating an open filament, is sensed at pin 9 of microprocessor 65. The starting sequence is then terminated and the microprocessor either awaits a command or attempts to start the lamp again.

Unlike the prior art, a single circuit, including resistor 76, resistor 77, and capacitor 78, provides the only detector necessary to monitor a plurality of DC parameters of lamp 83 or of the ballast. Microprocessor 65 is programmed to recognize a particular pattern of voltage versus time as indicative of the presence of a normal, functioning lamp. For example, sensing the voltage on capacitor 75 approximately 0.25 second after the ballast has started and sensing the voltage approximately four seconds after the ballast has started is indicative of the presence of a normal, functioning lamp if the voltage sensed each time is approximately one half the voltage on rail 81. The four second delay is to enable the lamp to "settle" after being started. Rectification is sensed as described above.

Microprocessor 65 is programmed to attempt to start a lamp after being off for a predetermined amount of time. Alternatively, the ballast can be restarted immediately by removing power for a short while, during which time the capacitors in the ballast have enough time to discharge, and then re-applying power. The ballast then attempts to restart, either a predetermined number of times or periodically for a predetermined period. If unsuccessful, microprocessor 65 enters a quiescent state, an endless loop or a shut-down mode, from which the microprocessor can be awakened only by removing and then reapplying electrical power or by replacing the lamp, either of which will cause initiation of the starting sequence.

Resistor 84 is in series with resonant capacitor 85 and provides a signal indicative of the AC voltage across lamp 83. This voltage is rectified by diode 87 and the signal is filtered by a low pass filter including resistor 88 and capacitor 89. The filtered, rectified signal is coupled to pin 10. If the voltage on pin 10 is moderately excessive for a prolonged period e.g. 120% of normal for two consecutive five second periods, microprocessor 65 shuts off the inverter until the ballast is reset. If the voltage on pin 10 is at the high voltage limit of the ballast (described in connection with FIG. 7) for ten milliseconds, then microprocessor 65 shuts off the inverter until the ballast is reset by temporarily shutting off electrical power to the ballast or by removing the lamp and replacing it.

The average AC voltage coupled to pin 10 of microprocessor 65 also provides a means for recognizing lamps and adjusting current accordingly. For example, 26 watt, 32 watt, and 42 watt lamps all run at the similar current but are characterized by different operating voltages. Once a lamp is started, the frequency of the switching transistors in the inverter is adjusted to give the appropriate current for those lamps. Microprocessor 65 also loads a table of parameters appropriate for the recognized lamp, e.g. lamp voltage limits and current limits, half bridge voltages indicative of rectification, starting parameters. Thus, in accordance with the invention, a physically simple circuit can provide AC fault detection and many other features not available in ballasts of the prior art.

In most commercial establishments, lamps are replaced while power is applied. Electronic ballasts sense lamp removal as lamp failure and attempt to restart the lamp by applying a high voltage pulse (gross overload). This event is recorded by microprocessor 65, which periodically measures lamp voltage. Microprocessor 65 is programmed to provide lumen maintenance by measuring the elapsed time since the last gross overload, assumed to be due to relamping. After normal operation is resumed, lamp current is gradually increased as a function of elapsed time, thereby providing a uniform output for the life of the lamp.

If ballast 50 is being used as an instant start ballast, and if the voltage sensed was due to the absence of a lamp during relamping, i.e. greatly excessive voltage for a brief period, the ballast is programmed to flash every second for five minutes while the ballast waits for a new lamp. After five minutes, the ballast can flash only once every ten seconds. "Flashing" is an attempt to start a lamp by providing a very high voltage at the output terminals for a very brief period. The number of flashes or the duration of the flashing cycle is often controlled by governmental or quasi-governmental regulations and is easily accommodated in software without any change in hardware.

FIG. 7 illustrates an analog voltage limiting circuit constructed in accordance with another aspect of the invention in which the circuit modifies the output pulses of the microprocessor. In FIG. 7, sense resistor 91 provides a voltage proportional to the AC voltage across lamp 83. This voltage is coupled through resistor 93 to transistor $Q_5$. In the event of an excess voltage, transistor $Q_5$ conducts, thereby momentarily grounding pin 2 of driver 67. With pin 2 grounded, the drive signal is removed for that part of each cycle and switching transistors $Q_7$ and $Q_8$ cease operation. As soon as the lamp voltage decreases below threshold, $Q_5$ turns off and pulses are passed unchanged to input pin 2. In effect, $Q_5$ modulates the duty cycle of the high frequency pulses applied to pin 2.

Transistor $Q_5$, and its associated resistors, add very little to the cost of a ballast yet provide a much more rapid response than microprocessor 65; tenths of a microsecond as opposed to several milliseconds. $Q_5$ provides cycle by cycle voltage limiting of the high frequency pulses, limiting the voltage to a high but tolerable value, e.g. 1200 volts peak.

In FIG. 8, when ballast 50 is first turned on, the rectified DC voltage on capacitor 100 is coupled through resistor 101 and charges capacitor 102. Capacitor 102 is coupled to pin 8 of boost controller 61, thereby providing power for the boost circuit to begin operation. Inductor 104 is magnetically coupled to inductor 103. Inductor 104 is coupled to pin 5 of boost controller 61 to provide an indication of zero crossing for timing the boost pulses to $Q_9$.

The voltage across inductor 104 is also used to charge capacitor 105 through diode 106. A charge pump or diode integrator circuit including capacitor 107 and diode 108 is added for improved performance. During negative half cycles of the signal from inductor 104, capacitor 107 is charged through diode 108. During positive half cycles of the signal from inductor 104, capacitor 107 discharges through diode 101 into capacitor 105. It was found empirically that the voltage on capacitor 105 is more uniform than the voltage would be without capacitor 107 and diode 108.

Capacitor 105 is a relatively large storage capacitor, e.g., 150 microfarads and 35 volts. This capacitor powers rail 110, which provides power for microprocessor 65 and driver 67. Thus, microprocessor 65 continues to receive power even during momentary interruptions in line voltage. A portion of the voltage on capacitor 105 is coupled through resistor 112 and diode 113 back to capacitor 102 and capacitor 109. The current through diode 113 adds to some of the current through resistor 101, which is effective primarily during starting. Diode 113 prevents driver 67 from operating until after the boost is operating and supplying power to both the microprocessor and the driver.

Transistor $Q_{10}$ is a series regulator for charging capacitor 114 and powering microprocessor 65. Current from capacitor 105 is coupled through resistor 112 to driver 67. The supply voltage to driver 67 is regulated by Zener diode 117 and filter capacitor 118. Transistor $Q_{11}$, also coupled to capacitor 114, senses the voltage on capacitor 114 and provides a power on reset for microprocessor 65. Other mechanisms for power on reset could be used instead.

The circuit of FIG. 8 is suitable for lamps having a preheating cycle. However, the time constant of resistor 101 and capacitor 105 is simply too long for an instant start ballast. The ANSI standard for an instant start ballast requires completion of the starting operation within 100 milliseconds of power being applied to the ballast. In the circuit of FIG. 8, the boost circuit alone takes about 100 milliseconds to begin operation.

FIG. 9 illustrates a ballast constructed in accordance with an alternative embodiment of the invention in which the boost circuit turns on much more quickly. In FIG. 9, the output of the boost circuit is coupled to bulk capacitor 120. In accordance with the invention, low voltage supply capacitor 121 is connected in series with bulk capacitor 120. In comparison with FIG. 8, capacitor 102 in FIG. 8 has been relocated as capacitor 121 in FIG. 9.

When power is applied, only the resistance of the winding in inductor 103 limits the current through diode 127 to capacitors 120 and 121. This provides an extremely rapid charging of capacitor 121 and enables ballast 60 to start more rapidly, in about 10 milliseconds. The voltage on capacitor 121 is coupled through resistor 123 and diode 124 to pin 8 of boost controller 61. After boost controller 61 begins operation, current through diode 113 charges capacitor 109 to a voltage higher than that set by Zener diode 126, thereby reverse biasing diode 124. If boost controller 61 ever stopped, resistor 128 provides a high resistance path for recharging capacitor 121 and eventually restarting the boost circuit. Diode 129 prevents reverse biasing of capacitor 121 during a rapid discharge of bulk capacitor 120, as when power is turned off. The remainder of the circuitry in FIG. 9 operates as described above with reference to FIG. 8.

In FIG. 4, LED 131 is connected to pin 1 of microprocessor 65. Resistor 132 is connected between a source of low voltage DC and LED 131. Similarly, LED 134 is connected to pin 3 of microprocessor 65. In accordance with one aspect of the invention, the available output ports of microprocessor 65 are used for controlling the filaments of a rapid start lamp and can be used to provide an indication of the nature of a fault or other condition within the ballast.

Figure 10:
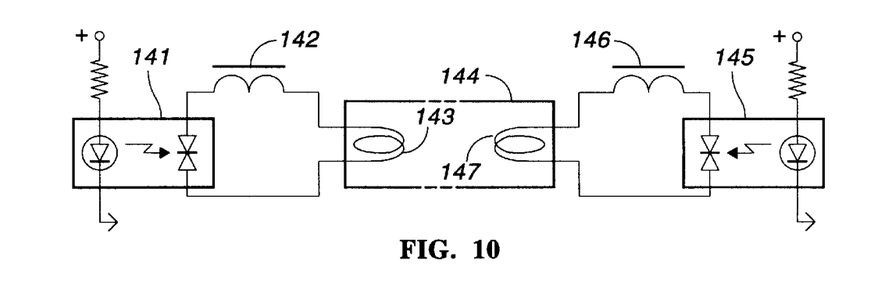
FIG. 10 illustrates heater control in accordance with another aspect of the invention.

In FIG. 10, opto-coupler 141 has a photo-triac connected in series with filament transformer 142 and filament 143. At the other end of lamp 144, opto-coupler 145 is connected in series with filament winding 146 and filament 147. The LEDs in opto-couplers 141 and 145 are coupled to microprocessor 65 for turning on the filaments during start up and turning off the filaments during normal operation to conserve power and improve the efficiency of the ballast. Filament windings 142 and 146 are coupled to a suitable source of voltage such as resonant inductor 35 (FIG. 2).

In accordance with another aspect of the invention, microprocessor 65 (FIG. 4) is programmed to provide an indication of the nature of the fault or of the condition of the ballast. Pins 1, 3, 4, and 5 are available for this purpose in a ballast constructed in accordance with FIGS. 2, 6, 7, and 8 or 9. In a preheating ballast, that is, a ballast including the filament control illustrated in FIG. 10, only two output pins are available from the particular microprocessor illustrated in FIG. 4. Even so, two output pins can provide four unique indications of the condition of the ballast. If all four output pins were available, then sixteen conditions can be uniquely identified by microprocessor 65 from the on and off pattern of the LEDs.

The indication provided by microprocessor 65 can take several forms. As illustrated in FIG. 4, LEDs can be connected to the output ports to provide a visual indication of a code indicative of the condition of the ballast. Alternatively, an external connection can be brought out from microprocessor 65 to the enclosure of the ballast, enabling one to attach a test probe to determine the state of the ballast. Yet another alternative does not require the use of any output ports.

By monitoring the voltage on bulk capacitor 120 (FIG. 6), microprocessor 65 can detect a signal as indicative of a communication mode. For example, five 20 millisecond power dips are used as an input signal to request the ballast for an indication of its present state. Microprocessor 65 is programmed to respond by flashing the lamps a predetermined number of times as an indication of the state of the ballast. The voltage on capacitor 120 is divided by resistors 79 and 80 and the fraction is applied to pin 16, which is configured as an input port to microprocessor 65. The dips or interruptions in power are brief, i.e. less than the time it takes to discharge capacitor 105 (FIG. 8) below a voltage sufficient for powering microprocessor 65.

Alternatively, in the communication mode, a programmed series of power dips can be used to control the lighting level of a lamp connected to the ballast. For example, the application of four 400 millisecond power dips is used to alert the ballast for communication. A subsequent series of power dips indicates the lighting level desired. For example, a subsequent series of three power dips tells the ballast to reduce power by 15%, 5% per power dip. In a simpler, and preferred, embodiment of the invention, a lamp is gradually ramped up in brightness until a momentary power interruption indicates the desired lighting level. Thus, an ordinary wall switch can be used as a dimmer with a ballast constructed in accordance with the invention.

A ballast constructed in accordance with the invention can easily accommodate the differing safety requirements of the American and European markets. For example, if the input to pin 9 of microprocessor 65 (FIG. 6) indicates that lamp 83 has begun rectifying, the microprocessor is programmed to flash every ten seconds, for instant start ballasts in the American market, or to shut off, for the European market. Similarly, if there is a very high voltage during starting, and starting is unsuccessful, then microprocessor 65 is programmed, in the American market, to re-heat the filaments, if any, and re-try at progressively longer intervals, e.g. once per second for five tries, then every five seconds for five tries, then every ten seconds for five tries, and so on. For the European market, microprocessor 65 is programmed to re-try for no more than five seconds and then shut off.

In addition to lumen maintenance, microprocessor 65 can be programmed to provide a short warm-up period for the lamp, during which the lamp is operated at greater than normal current to compensate for reduced light output from a cold lamp. After a predetermined period, e.g. five minutes, the current is reduced to normal level. This feature makes it seem that the lamp has constant light output.

In a series resonant circuit, most of the voltage drop is across the inductor when the circuit operates above resonance and is across the capacitor when the circuit operates below resonance. Modern ballasts typically start at a frequency that is approximately twice the unloaded resonant frequency and sweep downward to a frequency that is approximately ninety percent or more of the unloaded resonant frequency. It has been found advantageous to start a ballast having a series resonant output by going from a frequency above unloaded resonance, for heating filaments, directly to a frequency below unloaded resonance rather than sweeping frequency. By not sweeping frequency, one avoids problems associated with the inductor saturating and one can use a smaller, lower cost inductor. In accordance with this aspect of the invention, microprocessor 65 is programmed to jump from a frequency above resonance to a frequency below resonance, without sweeping, while starting a lamp.

Programming a microprocessor to produce the requisite machine states for implementing the invention is well within the ability of one of ordinary skill in the art given the functions described above.

The invention thus provides an electronic ballast that is adaptable to many types of gas discharge lamps and is adaptable to differing voltage and safety requirements of world markets with minimal changes in hardware. A ballast constructed in accordance with the invention can accommodate a wide range of faults without damage to the ballast and, if a lamp should fail, without further damage to a lamp coupled to the ballast. Further, the ballast can communicate the nature of a fault in response to an inquiry and can dim in response to an ordinary light switch.

Having thus described the invention, it will be apparent to those of skill in the art that many modifications can be made with the scope of the invention. For example, voltage regulator IC's can be substituted for the voltage regulator circuits shown. Many suitable products exist for the functions of power factor correction, microprocessor, and level shifting driver. A programmable logic array or other digital controller can be used instead of a microprocessor. A reference to memory, I/O, or other functions "in" the microprocessor is not intended to exclude external memory, external I/O circuitry, etc. The converter section can be a buck, buck/boost, or any other topology that can provide the required rail voltages from the various power line voltages. The output can be a full bridge instead of a half bridge and can use a different resonant circuit. The same resistor and capacitor in parallel with lamp 83 can be used for AC voltage sensing (FIG. 6) and for voltage limiting (FIG. 7).

What is claimed is:

1. In an electronic ballast for a gas discharge lamp having filaments at each end of the lamp, said ballast including an AC to DC converter for changing alternating current at low voltage to high voltage direct current on a power rail, an inverter coupled to said converter, and a microprocessor in said inverter for controlling said inverter, said inverter including a resonant output and a half bridge capacitor coupled to said output, said microprocessor including a first input port coupled to said half bridge capacitor for measuring the DC voltage on said half bridge capacitor, the improvement comprising:

said microprocessor including a second input port coupled to said power rail for receiving a signal proportional to the voltage on said power rail; and said microprocessor contains a stored program for comparing said DC voltage with said signal and for reducing the output voltage from said inverter when the comparison is not within predetermined limits.

2. The ballast as set forth in claim 1 wherein said microprocessor is programmed to flash said lamp periodically when the comparison is not within predetermined limits.

3. In an electronic ballast for a gas discharge lamp having filaments at each end of the lamp, said ballast including an AC to DC converter for changing alternating current at low voltage to direct current at high voltage, an inverter coupled to said converter, and a microprocessor in said inverter for controlling said inverter, said inverter including a resonant output and a half bridge capacitor coupled to said output, said microprocessor including a first input port coupled to said half bridge capacitor for measuring the DC voltage on said half bridge capacitor, the improvement comprising:

said microprocessor contains a stored program for sensing rectification by said lamp and for reducing the output voltage of said inverter in the event of lamp rectification; and said microprocessor includes a second input port coupled to said lamp for detecting the AC voltage across said lamp and wherein said microprocessor includes a stored program for measuring the AC voltage across said lamp and for shutting off said lamp if said AC voltage is slightly above normal for a long time or if said AC voltage is greatly above normal for a short time.

4. The ballast as set forth in claim 3 wherein said microprocessor is programmed to flash said lamp periodically if the lamp is not conducting.

5. The ballast as set forth in claim 3 wherein said microprocessor is programmed to use the measured AC voltage to recognize a lamp from a plurality of lamp types and to select the appropriate current and lamp control parameters for the recognized lamp from a set of parameters stored in said microprocessor.

6. In an electronic ballast for a gas discharge lamp, said ballast including an AC to DC converter for producing direct current at high voltage, a half-bridge output circuit coupled to said converter and including series connected alternately conducting transistors, a drive circuit for controlling said transistors, a microprocessor coupled to at least said drive circuit and providing high frequency pulses to said drive circuit; the improvement comprising:

an analog fault detector coupled to said microprocessor for overriding said microprocessor in the event of a fault.

7. The electronic ballast as set forth in claim 6 wherein said detector senses overvoltage and interrupts said high frequency pulses.

8. The electronic ballast as set forth in claim 7 wherein said detector interrupts individual high frequency pulses to reduce the duty cycles of the high frequency pulses.

9. In an electronic ballast for a gas discharge lamp, said ballast including an AC to DC converter for producing direct current at high voltage, a bulk capacitor for storing energy from said converter, an inverter powered from said bulk capacitor, and a microprocessor in said inverter for controlling said inverter, the improvement comprising:

a storage capacitor for storing energy at low voltage for powering said microprocessor, wherein said storage capacitor and said bulk capacitor are connected in series, thereby enabling said ballast to turn on rapidly.

10. The ballast as set forth in claim 9 wherein said converter includes a first integrated circuit for boosting said high voltage and said inverter includes a half-bridge output and a second integrated circuit for driving said half-bridge output and wherein said first integrated circuit and said second integrated circuit are powered from said storage capacitor.

11. In an electronic ballast for a gas discharge lamp, said ballast including an AC to DC converter for changing alternating current at power line voltage to direct current, an inverter coupled to said converter and adapted to be coupled to said lamp for producing a first voltage for said lamp, a microprocessor in said inverter for controlling said inverter, said microprocessor including an input port, and a detector coupled to said input port for sensing a second voltage, the improvement comprising:

said microprocessor contains a stored program for recognizing a particular pattern of voltage versus time as indicative of the presence of a normal, functioning lamp.

12. The electronic ballast as set forth in claim 11 wherein said microprocessor is programmed to try to restart the lamp a predetermined number of times when a fault is detected.

13. The electronic ballast as set forth in claim 11 wherein said microprocessor is programmed to try to restart the lamp a predetermined time after a fault is detected, wherein said predetermined time is obtained from a table stored in said microprocessor.

14. In an electronic ballast for a gas discharge lamp, said ballast including an AC to DC converter for changing alternating current at power line voltage to direct current, an inverter coupled to said converter and adapted to be coupled to said lamp, a microprocessor in said inverter for controlling said inverter, said microprocessor including an input port, and a detector coupled to converter for sensing said power line voltage, the improvement comprising:

said microprocessor is programmed to respond to commands given by interrupting said power line voltage.

15. In an electronic ballast for a gas discharge lamp, said ballast including an AC to DC converter for changing alternating current to direct current, an inverter coupled to said converter, a microprocessor in said inverter for controlling said inverter, said microprocessor including an output port, the improvement comprising:

opto-isolators coupled to said output port and to the filaments of said gas discharge lamp, wherein said microprocessor controls current through said filaments by means of said opto-isolators.

16. In an electronic ballast for a gas discharge lamp, said ballast including an AC to DC converter for producing direct current at high voltage from a source of input power, a bulk capacitor for storing energy from said converter, an inverter powered from said bulk capacitor, and a microprocessor in said inverter for controlling said inverter, the improvement comprising:

said microprocessor contains a stored program for interpreting one or more brief dips in said input power as a command.

17. The ballast as set forth in claim 16, wherein said command adjusts the output power to said lamp.

18. The ballast as set forth in claim 16, wherein said command causes said ballast to produce an indication of a condition of said lamp.

19. The ballast as set forth in claim 18 wherein said indication is brief variations in brightness of said lamp.

20. The ballast as set forth in claim 16 wherein said microprocessor contains a stored program for increasing the current through said lamp as said lamp ages.

21. In an electronic ballast for a gas discharge lamp, said ballast including an AC to DC converter for changing alternating current to direct current, an inverter coupled to said converter and adapted to be coupled to said lamp for producing a first voltage for said lamp, a microprocessor in said inverter for controlling said inverter, said microprocessor including an input port, and a detector coupled to said input port for sensing said first voltage, the improvement comprising:

said microprocessor contains a stored program for measuring time elapsed from an overload in said first voltage and for increasing lamp current as a function of the time elapsed, thereby providing automatic lumen depreciation compensation.

22. In an electronic ballast for a gas discharge lamp, said ballast including an AC to DC converter for producing direct current at high voltage, a bulk capacitor for storing energy from said converter, an inverter powered from said bulk capacitor, and a microprocessor in said inverter for controlling said inverter, the improvement comprising:

said microprocessor contains a stored program for increasing the current through said lamp as said lamp ages.

23. In an electronic ballast for a gas discharge lamp, said ballast including an AC to DC converter for producing direct current at high voltage from a source of input power, a bulk capacitor for storing energy from said converter, an inverter powered from said bulk capacitor, and a microprocessor in said inverter for controlling said inverter, the improvement comprising:

said microprocessor contains a stored program for starting said lamp at reduced power and increasing the power to said lamp in steps until either full power is reached or there is a momentary dip in the input power to said ballast.

24. The ballast as set forth in claim 23 wherein said microprocessor contains a stored program for increasing the current through said lamp as said lamp ages.

25. In an electronic ballast for a gas discharge lamp, said ballast including an AC to DC converter for producing direct current at high voltage from a source of input power, a bulk capacitor for storing energy from said converter, an inverter powered from said bulk capacitor, and a microprocessor in said inverter for controlling said inverter, the improvement comprising:

said microprocessor contains a stored program for starting said lamp at a predetermined current, monitoring the voltage across said lamp, and then selecting operating parameters for the lamp from data stored in said microprocessor.

26. The ballast as set forth in claim 25 wherein said microprocessor contains a stored program for increasing the current through said lamp as said lamp ages.

27. In an electronic ballast for a gas discharge lamp, said ballast including an AC to DC converter for producing direct current at high voltage from a source of input power, a bulk capacitor for storing energy from said converter, an inverter powered from said bulk capacitor, and a microprocessor in said inverter for controlling said inverter, said microprocessor including an input port and detectors coupled to a node within said ballast, the improvement comprising:

said microprocessor contains a stored program for detecting a first voltage on said node as indicative of filament continuity and commencing a starting sequence if said first voltage is detected.

28. The electronic ballast as set forth in claim 27, wherein said ballast includes a half bridge inverter and a half bridge capacitor in series with said lamp, and wherein said node is one side of said half bridge capacitor.

29. In an electronic ballast for a gas discharge lamp, said ballast including an half-bridge inverter for producing an output voltage at a series resonant, direct coupled output, a half-bridge capacitor coupled to said output, and a microprocessor in said inverter for controlling said inverter, said microprocessor including an input port coupled to said half-bridge capacitor for monitoring the voltage on said half-bridge capacitor, the improvement comprising:

said microprocessor containing a stored program for reducing said output voltage when said output voltage indicates a fault and for maintaining said output voltage at a reduced level until either a predetermined time has elapsed or the ballast is made to restart by the lamp being replaced.

30. In an electronic ballast for a gas discharge lamp, said ballast including an AC to DC converter for producing direct current at high voltage from a source of input power, a bulk capacitor for storing energy from said converter, an inverter powered from said bulk capacitor, and a microprocessor in said inverter for controlling said inverter, said inverter including a series resonant, direct coupled output, the improvement comprising:

said microprocessor contains a stored program for starting said lamp at a first frequency and then changes to a second frequency without sweeping through intermediate frequencies, wherein said first frequency is above the resonant frequency of said output and said second frequency is below the resonant frequency of said output.

31. The ballast as set forth in claim 30 wherein said microprocessor contains a stored program for increasing the current through said lamp as said lamp ages.

32. In an electronic ballast for a gas discharge lamp having at least one filament, said ballast including a DC blocking capacitor coupled to said filament and an inverter for powering said lamp, said microprocessor including a first input port coupled to said capacitor for measuring the DC voltage on said capacitor, the improvement comprising:

said microprocessor contains a stored program for measuring said DC voltage shortly after starting and again a predetermined time later to verify normal operation of said lamp, said microprocessor stopping said inverter if either measurement is out of range.

* * * * *